United States Patent [19]
Chamberlin et al.

[11] Patent Number: 5,232,092
[45] Date of Patent: Aug. 3, 1993

[54] SHOCK SHIELD FOR SHIPPING CASES

[75] Inventors: Davis W. Chamberlin, St. Paul; John A. Heveron, Champlin; Gerald J. Niles, St. Paul, all of Minn.

[73] Assignee: Minnesota Mining and Manufacturing Company, St. Paul, Minn.

[21] Appl. No.: 827,571

[22] Filed: Jan. 28, 1992

Related U.S. Application Data

[63] Continuation-in-part of Ser. No. 600,670, Oct. 22, 1990.

[51] Int. Cl.$^5$ .............................. B65D 85/672
[52] U.S. Cl. .................. 206/387; 206/389; 206/403; 206/408; 206/521
[58] Field of Search ............... 206/387, 389, 521, 391, 206/394, 53, 54, 403, 404, 405, 406, 408, 587, 591, 592, 593, 594

[56] References Cited

U.S. PATENT DOCUMENTS

| | | | |
|---|---|---|---|
| 3,125,216 | 3/1964 | Kulka | 206/53 |
| 3,307,688 | 3/1967 | Widmont, Jr. | 206/406 |
| 3,339,718 | 9/1967 | Geiger | 206/406 |
| 3,353,660 | 11/1967 | Will | 206/52 |
| 3,754,421 | 8/1973 | Wirth | 206/405 X |
| 4,676,370 | 6/1987 | Rudick | 206/406 X |
| 4,754,878 | 7/1988 | Bose | 206/53 X |

FOREIGN PATENT DOCUMENTS

| | | |
|---|---|---|
| 903017 | 8/1962 | United Kingdom . |
| 934081 | 8/1963 | United Kingdom . |
| 988673 | 4/1965 | United Kingdom . |
| 1126864 | 9/1968 | United Kingdom . |
| 1299196 | 12/1972 | United Kingdom . |
| 1427438 | 3/1976 | United Kingdom . |
| 2151330 | 7/1985 | United Kingdom . |

*Primary Examiner*—Steven N. Meyers
*Assistant Examiner*—Jacob K. Ackun, Jr.
*Attorney, Agent, or Firm*—Gary L. Griswold; Walter N. Kirn; Charles D. Levine

[57] ABSTRACT

A shock shield formed of an annular body having a central axial hole which mounts within a case is disclosed. A cylindrical axial ring is formed around the central axial hole. The shock shield permits a tape reel stored within the case to rotate within the case and absorbs shocks to prevent damage to the tape reel. A tab on the shield mates with the tape reel to prevent relative rotation therebetween. Shock absorption is accomplished by compressible elements formed on the shield body. The compressible elements are annular bearing rings concentric with the annular circumference. The annular bearing rings have a generally V-shaped cross section and an axial height less than the axial height of the axial ring. The shield body preferably is formed of four spaced radial members to enhance flexion.

23 Claims, 6 Drawing Sheets

SHOCK SHIELD FOR SHIPPING CASES

This is a continuation-in-part of application Ser. No. 07/600,670 filed Oct. 22, 1990.

TECHNICAL FIELD

The present invention relates to protective devices for use in tape reel shipping or storage cases. More particularly, the present invention relates to protective devices which permit rotation of a tape reel within a shipping or storage case and which also absorb shocks.

BACKGROUND OF THE INVENTION

Tape reels, such as video or computer tape reels having large diameter hubs, are stored, handled, and shipped in shipping or storage cases with the tape reel frictionally placed on a central aligned hub projecting from the side walls of the case. Such containers or cases are well known. Early containers included annular flexible rings over which the tape reels are fit to prevent the reels from rotating. This configuration was found to damage the tape when the case was dropped or mishandled.

Figure 5:
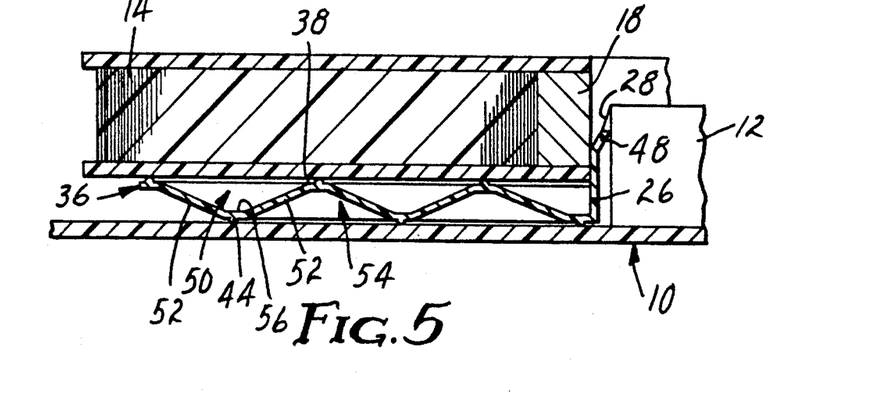
FIG. 5 is a cross-sectional view of the shock shield taken along line 5—5 of FIG. 4.

U.S Pat. No. 3,353,660 to Will, discloses a shipping container for tape reels having an annular friction-reducing bearing ring disposed in each container side wall. The bearing ring is slipped over each side wall hub to provide a surface on which the tape reel is seated. This bearing ring prevents axial translational tape reel movement while permitting the reel to rotate with respect to the container when subject to external movements. In the embodiment of FIG. 5, a pair of annular bosses are provided to increase the thickness of the bearing ring and provide additional support against bending forces. However, while resisting bending forces, this bearing ring does not flex to provide axial shock absorption. Additionally, there is no mechanism to prevent the bearing ring from rotating relative the tape reel to improve the protection afforded the tape reel.

There is no known shock shield which provides sufficient shock absorption for tape reels when the storage or shipping case is subjected to mechanical shock. None of the known tape reel cases provides an adequate level of protection against damage to the tape and tape reel during shipping, storage, and handling.

SUMMARY OF THE INVENTION

The present invention overcomes the deficiencies of the prior art devices with a shock shield for use with tape reel shipping or storage cases. The shock shield is formed of an annular body having a central axial hole which mounts within a case. The shock shield can be a complete annular ring or can have portions of the ring removed. In the latter configuration, while the overall shape is annular, the shock shield is essentially a central ring with radially extending arms which culminate in annular portions. A cylindrical axial ring is formed around the central axial hole to locate the shock shield within the case. The shock shield is shaped to permit a tape reel stored within the case to rotate around its axis within the case, and to absorb shocks and prevent case displacements from being transmitted to and damaging the tape reel. This is accomplished by compressible elements formed on the shield body. The compressible elements are annular bearing rings concentric with the annular circumference. The annular bearing rings have a generally V-shaped cross section and an axial height less than the axial height of the axial ring. Additionally, a compressible element may be formed on the cylindrical axial ring formed around the central axial hole.

Alternatively, the compressible elements formed on the shield body can be cone-shaped projections extending axially out of the plane of the shield body both above the plane of the shield body and below the plane of the shield body. The cone-shaped projections may be arranged randomly or in annular rings.

The shock shield of the present invention is more flexible and provides greater shock absorption characteristics when subjected to mechanical shock than the prior art shields. Due to the reduced surface area contact between the shield and the case, friction is reduced, thereby improving the rotational ability of the tape reel as compared with prior art shields. This reduces the likelihood of damage to the tape reel during shipping, storage, and handling, and reduces production costs of the shield due to its reduced size and thickness. Furthermore, the shock shield is provided with at least one radially extending tab which is received in a complementarily shaped opening in the tape reel hub. Interaction between the tab and opening causes the tape reel to rotate with the shock shield.

DETAILED DESCRIPTION OF PREFERRED EMBODIMENTS

Figure 1:
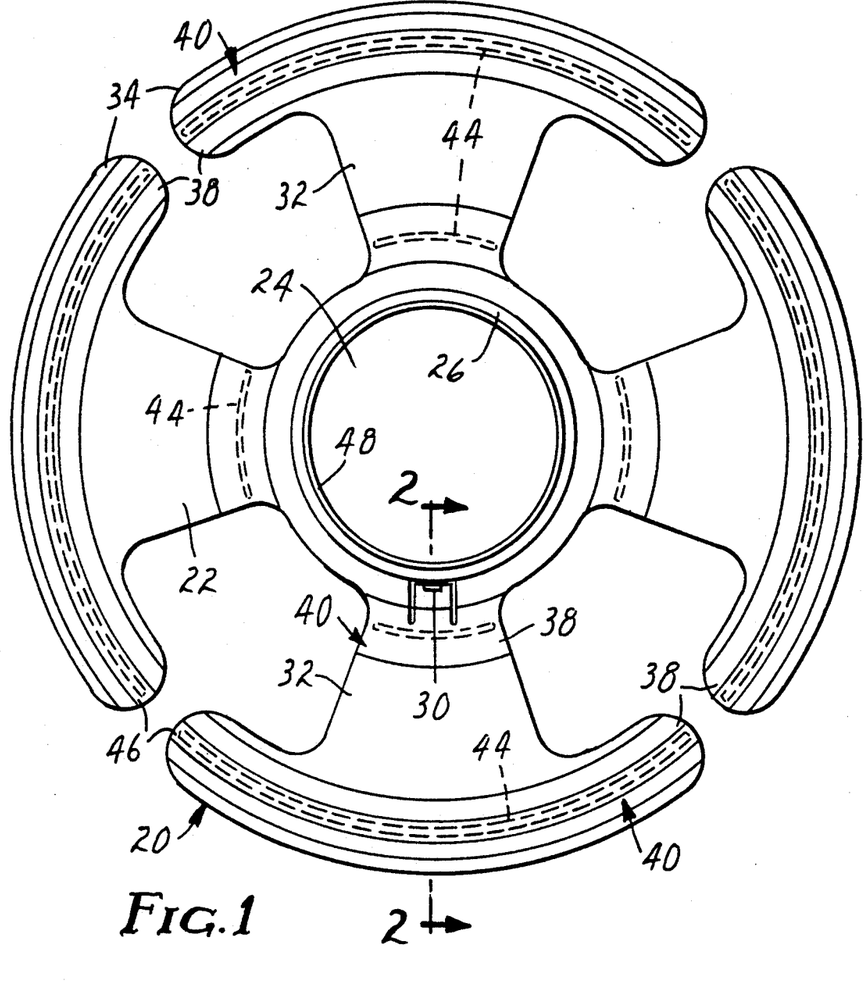
FIG. 1 is a top view of a shock shield according to the present invention.
Figure 2:
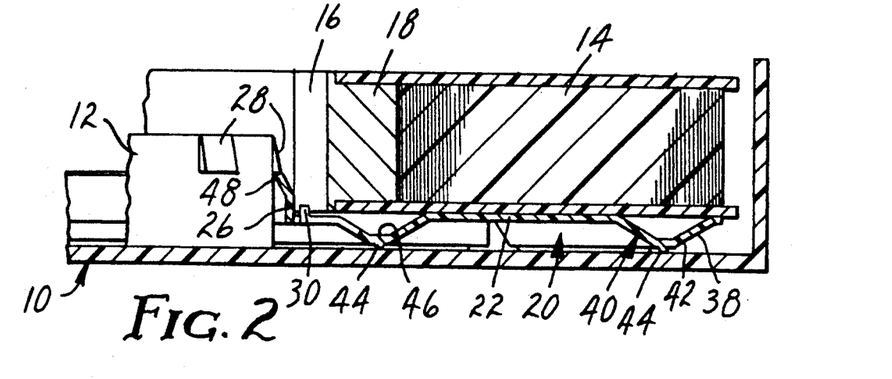
FIG. 2 is a cross-sectional view of the shock shield taken along line 2—2 of FIG. 1, placed in a case and showing the shock shield in the uncompressed state.
Figure 3:
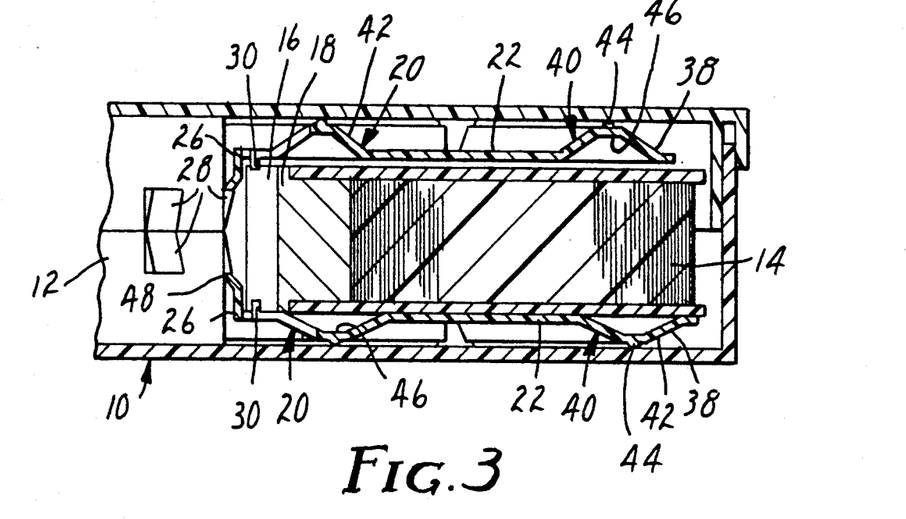
FIG. 3 is a cross-sectional view of the shock shield of FIG. 2 showing the shock shield in a partially compressed state.

Referring first to FIGS. 1, 2, and 3 which illustrate the preferred embodiment of a shock shield 20, the shock shield 20 is formed of a generally annular shield body 22, although other shapes may be used. The shock shield 20 can be used with known hubbed cases 10 designed for use with similarly sized tape reels. The shock shield 20 has a central axial hole 24 which mounts around the central axial hub 12 of the case 10, and a cylindrical axial ring 26 defines the central axial hole 24. The cylindrical axial ring 26 provides a larger axial surface area contacting the case hub 12 to assist locating the shock shield 20 within the case 10. In use, two shock shields 20 are placed in each case 10, one on each side of a tape reel 14 to be stored. Each shock shield 20 is secured around a case side wall hub 12 in a known manner, such as by a securing lip 28 mounted on the case hub 12 to permit rotation of the shock shield 20 relative to the case wall while preventing the shock shield 20 from inadvertently sliding off of the hub 12. The cylindrical axial ring 26 extends beyond the general plane of the shield body 22 and fits over the case side wall hub 12. The tape reel 14 is placed snugly between the shock shields 20 such that the tape reel 14 and the shock shields 20 rotate together when any rotation occurs. Furthermore, the shock shields 20 flex by compressing axially as well as radially in response to axial and radial forces, respectively.

The shock shield 20 is shaped to permit a tape reel 14 stored within the case 10 to rotate around its axis within the case 10 and to absorb shocks and prevent sudden case displacements from being transmitted to and damaging the tape reel 14. Rotation of the tape reel 14 with the shock shield 20 is accomplished by physically connecting the two together. The shock shield 20 is provided with at least one axially extending tab 30 mounted on the shield body 22 adjacent the cylindrical axial ring 26. The tab 30 is received in an opening 16 in the tape reel hub 18. Preferably the opening 16 and the tab 30 are complementarily-shaped. Interaction between the tab 30 and opening 16 causes the tape reel 14 to rotate with the shock shield 20 and eliminates the possibility of relative rotation between the tape reel 14 and the shock shield 20 as was common with known bearing rings. Preferably the tab 30 is formed on a portion of the shield body 22 that is separated from the remainder of the shield body 22 on a majority of its perimeter by a thin peripheral gap. This facilitates molding of the shock shield 20.

As shown in the embodiment of FIGS. 1, 2, and 3, the shield body 22 preferably is not solid to simplify molding. The shield body 22 includes four members 32 which radially extend from the cylindrical axial ring 26 and are uniformly disposed around the axial ring 26. Each radial member 32 culminates in a peripheral annular circumferential portion 34 such that the four circumferential portions 34 extend for 336° or 93.3% of the total circumference of the shield body 22. Preferably, the radial members 32 widen from the axial ring 26 to the circumferential portions 34, as illustrated. It is also preferred that all of the connections between the members 32, the axial ring 26, and the circumferential portions 34 be radiused equally. This non-solid configuration enhances the ability of the shock shield 20 to twist.

Figure 4:
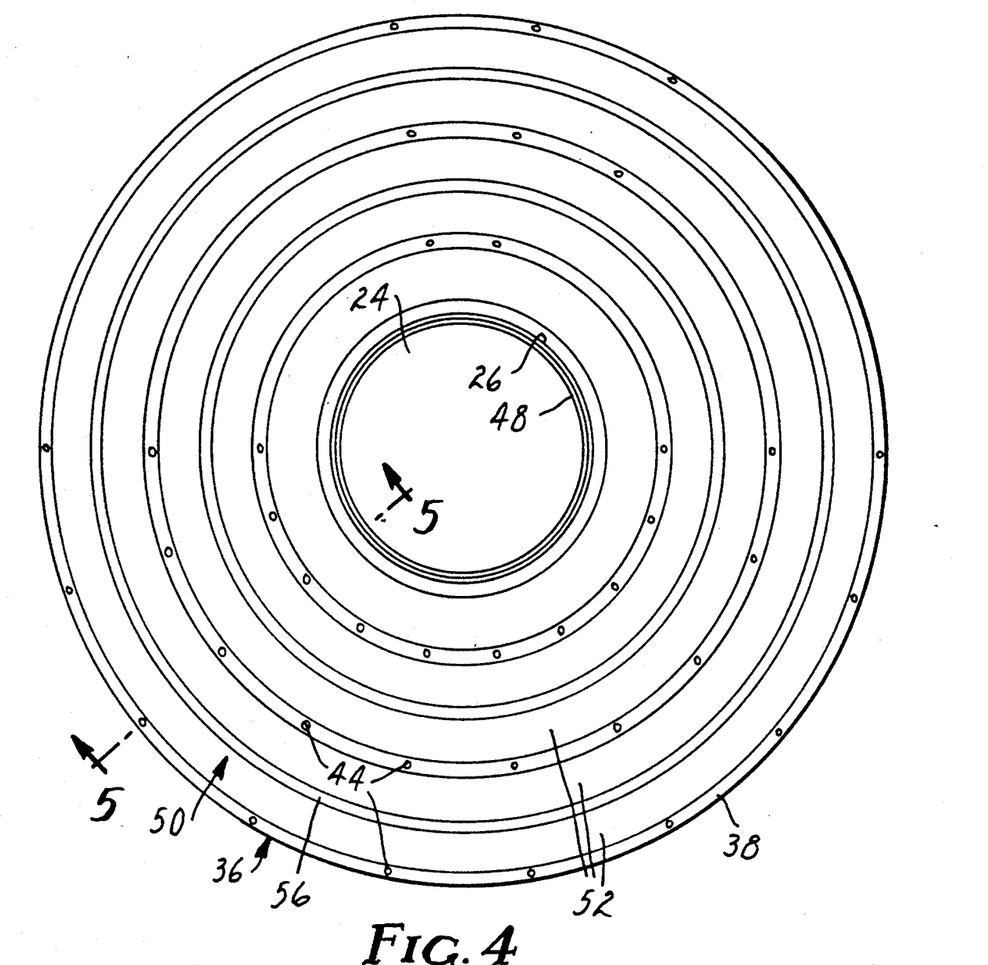
FIG. 4 is a top view of the shock shield according to another embodiment of the present invention.

In an alternate embodiment shown in FIGS. 4 and 5, the shield body 22 is formed as a solid annulus 36 or can be formed with radial slits (not shown) in the shield body 22 to improve axial flexion of the shock shield 20.

Shock absorption and the prevention of sudden case displacements from being transmitted to and damaging the tape reel 14 are accomplished by compressible elements 38 formed on the shield body 22. The compressible elements 38 preferably are annular bearing rings 40 concentric with the cylindrical axial ring 26, which may or may not be perpendicular to the radius of the shield 20. Two or three annular bearing rings 40 are preferably used. In the embodiment of FIGS. 1, 2, and 3 only two rings 40 are used, and two and one-half rings 40 are used in the FIGS. 4 and 5 embodiment. Additionally, one larger bearing ring 40 or many smaller bearing rings 40 also could be used. The annular bearing rings 40 preferably have a generally V-shaped or U-shaped cross section and an axial height less than the axial height of the axial ring 26. Also, a ring compressible element 48 may be formed on the cylindrical axial ring 26 formed around the central axial hole 24. This ring compressible element 48 can be formed as a radially inwardly extending portion of the cylindrical axial ring 26 as shown.

In the preferred embodiment as shown in FIGS. 2 and 3, two upright V shapes 42 are shown formed on the shock shield body 22. A plurality of friction tips 44 are provided on each annular V vertex 46. These friction tips 44 reduce the surface area of the shock shield 20 which contacts the inside walls of the case to reduce friction and promote freer rotation of the shock shield 20 within the case 10. Additionally, a ring compressible element 48 may be formed on the cylindrical axial ring 26 formed around the central axial hole 24. This ring compressible element 48 is an annular bearing ring and can simply be formed as a radially inwardly extending portion of the cylindrical axial ring 26 as illustrated.

In the embodiment of FIGS. 4 and 5, two and one-half upright V shapes 50 are formed on the solid annulus 36 of the shield body 20. The same body segments 52 which form the upright V shapes 50 form two and one-half inverted V shapes 54 such that each body segment 52 serves as half of an upright V 50 and half of an inverted V 54. A plurality of friction tips 44 are provided on each annular V vertex 56.

When the case 10 is subjected to axial forces, the shock shields 20 compress axially. The annular bearing rings 40 compress from the rest position shown in FIG. 2 to that shown in FIG. 3, in which the lower shock shield 20 is compressed between the tape reel 14 and the lower wall of the case 10 leaving a gap between the upper shock shield 20 and the tape reel 14. Each shock shield 20 can preferably withstand up to 67N (15 lb) of force. When the case 10 is subjected to radial forces, the compressible element 48 on the cylindrical axial ring 26 compresses to absorb the forces.

The compressible elements 38 will compress and absorb shocks when the case 10 with a shock shield 20 and a 62 N (14 lb) tape reel 14 are dropped from a height of approximately one meter at temperatures of less than $-6°$ C., as typically can occur during storage and shipping. The compressibility of the compressible elements 38 are dependent primarily on the geometry of the elements and the configuration of the shock shield 20 in general. The compressibility is also due in small part to the material of the shield as the material itself is slightly compressible. As described and illustrated, the shock shield 20 provides a large degree of shock absorption. The known bearing rings, such as disclosed in U.S. Pat. No. 3,353,660 to Will, do not provide axial shock absorption, except for a small insignificant degree of absorption due partially to the compression of the material itself, but primarily to molding imperfections which warp the bearing ring. The measured compression is due to removing the warp and flattening the bearing ring.

Figure 8:
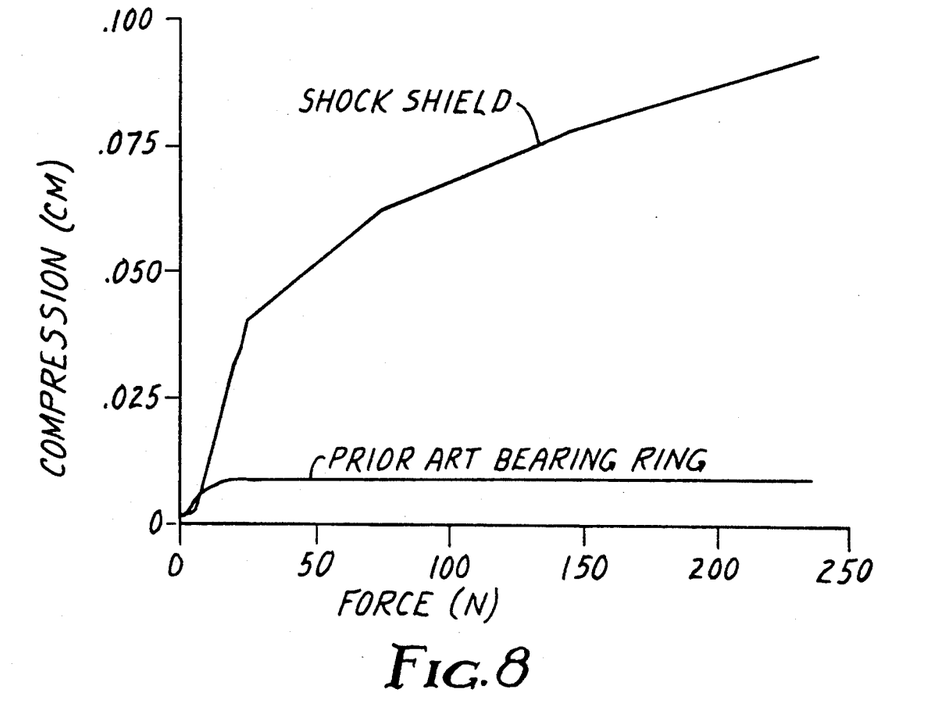
FIG. 8 is a graph comparing the axial compression of the shock shield with that of a known bearing ring.

This difference in shock absorption characteristics is evidenced by a comparison of the axial deflection under varying loads or shocks for the shock shield of FIGS. 1–3 with a bearing ring as disclosed in Will. FIG. 8 graphically illustrates the data presented in the following chart.

| Force (N) | Will Deflection (cm) | Invention Deflection (cm) |
|---|---|---|
| 1.8036 | .0013 | .0018 |
| 3.6060 | .0028 | .0023 |

-continued

| Force (N) | Will Deflection (cm) | Invention Deflection (cm) |
| --- | --- | --- |
| 5.4234 | .0046 | .0023 |
| 7.0798 | .0058 | .0023 |
| 8.8753 | .0066 | .0079 |
| 10.6752 | .0068 | .0114 |
| 12.4800 | .0076 | .0165 |
| 14.2703 | .0079 | .0203 |
| 16.0886 | .0081 | .0236 |
| 17.8938 | .0081 | .0274 |
| 19.6948 | .0081 | .0310 |
| 21.4916 | .0081 | .0338 |
| 23.3095 | .0084 | .0356 |
| 25.1088 | .0086 | .0406 |
| 74.4186 | .0089 | .0635 |
| 141.8250 | .0089 | .0787 |
| 231.7744 | .0089 | .0940 |

As the chart and graph indicate, the Will bearing ring compresses due to material compression about as much as the shock shield 20 at forces up to 9N. This force level is relatively small, much less than occurs when a 62N (14 lb) tape reel 14 is dropped from a height of approximately one meter at temperatures of less than −6° C. The Will bearing ring only deflects an additional 35% when the loads are increased over 25 times. In contradistinction, the shock shield 20 deflects almost 12 times with this 25 fold increase in force. The shock shield 20 deflects due to these loads to protect the tape reels 14. The Will bearing ring does not.

Figure 6:
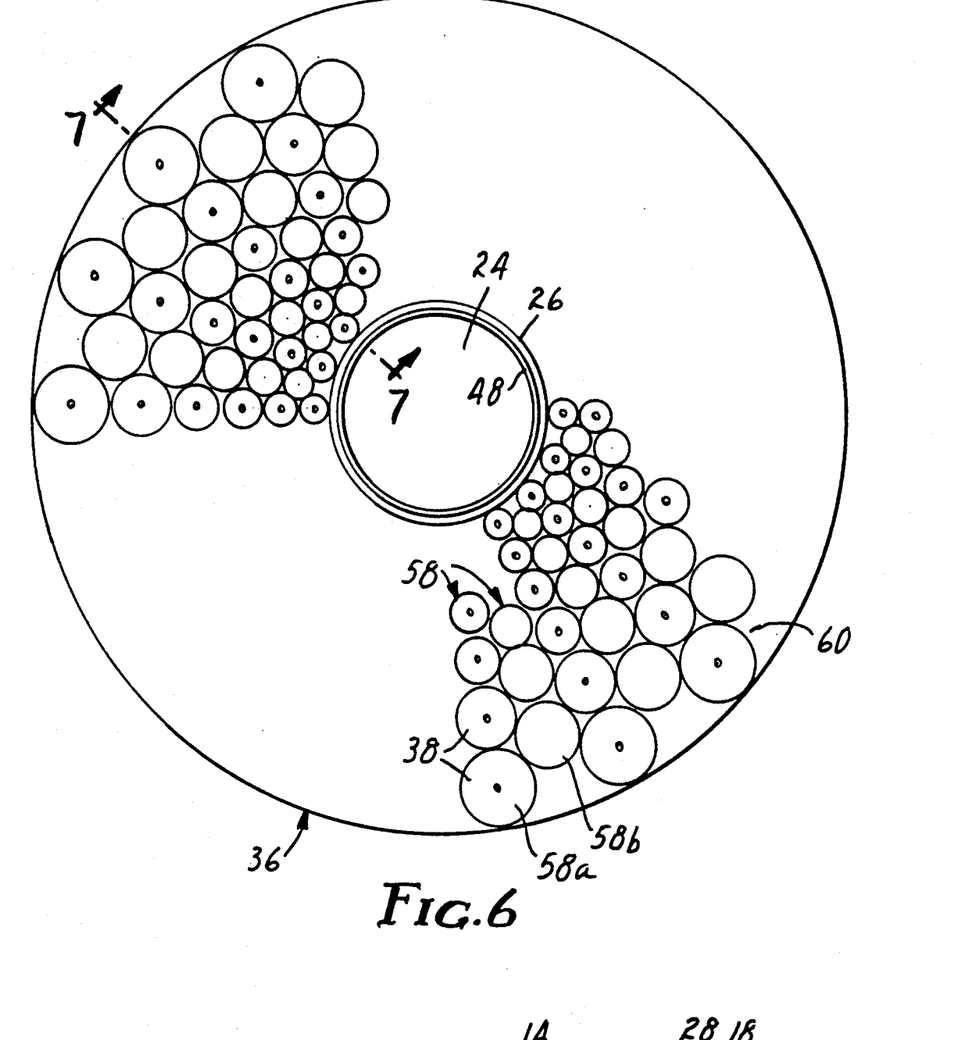
FIG. 6 is a top view of the shock shield according to another embodiment of the present invention.
Figure 7:
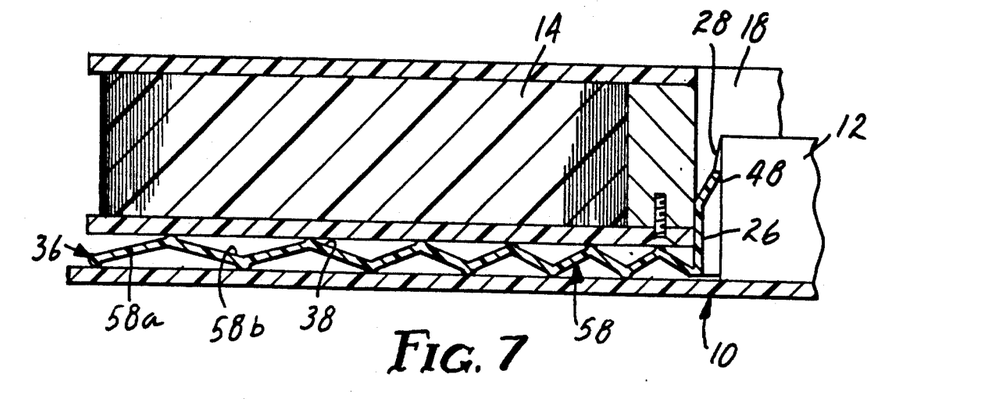
FIG. 7 is a cross-sectional view of the shock shield taken along line 7—7 of FIG. 6.

Alternatively, as shown in FIGS. 6 and 7, the compressible elements 38 formed on the shield body 22 are cone-shaped projections 58 extending axially out of the plane of the shield body 22 such that some cone-shaped projections 58a extend above the plane of the shield body 22 and the other cone-shaped projections 58b extend below the plane of the shield body 22. The cone-shaped projections 58 can be randomly arranged on the shield body 22 or, as shown, may be arranged in a plurality of annular rings 60. When the cone-shaped projections 58 are arranged in an ordered manner, it is preferred that alternating cone-shaped projections 58a extend above the shield body 22 and the intermediate alternating cone-shaped projections 58b extend below the shield body 22.

At least the bearing surface of the shock shield 20 and preferably the entire shock shield 20 is formed of a hard, smooth, low friction material such as polymeric materials. Polyethylene, polytetrafluoroethylene, nylon, and other thermoplastic resins can be used. The material should have relatively low static and dynamic coefficients of friction with the inside surface of the case to permit the shock shield 20 to rotate with a tape reel within the case during movement of the case. Preferably, the shock shield 20 is formed of polyethylene by injection molding and has a thickness of from 0.10 to 0.28 cm (0.040 to 0.110 in). This shock shield 20 can withstand 67N of force and can absorb a 90 cm (36 in) drop without bottoming out or damaging the tape reel.

The shock shield 20 is more flexible and provides greater shock absorption characteristics when subjected to mechanical shock than earlier shields. Due to the reduced surface contact area between the shield 20 and the case 14, friction is reduced, thereby improving the rotational ability of the tape reel. This reduces the likelihood of damage to the tape reel during shipping, storage, and handling. Additionally, the shock shield 20 is cheaper to produce due to its reduced size and thickness.

FIGS. 9A-9D illustrates an alternative embodiment of the present invention in which the compressible element 48 of the cylindrical axial ring 26 has a compressible, deformable, hub-contacting arm 62 which moves in two directions to better absorb shocks and protect the tape reel 14. The arm 62 includes a cylindrical axial ring portion 64 extending in the same direction as and forming part of the cylindrical axial ring 26. A connecting portion 66 extends from the cylindrical axial ring portion 64 and an end portion 68 extends from the connecting portion 66 in substantially the opposite direction to that of the cylindrical axial ring portion 64. The connecting portion 66 forms the top of the arm 62 and the end portion 68 forms the bottom of the arm 62.

Figures 9A, 9B:
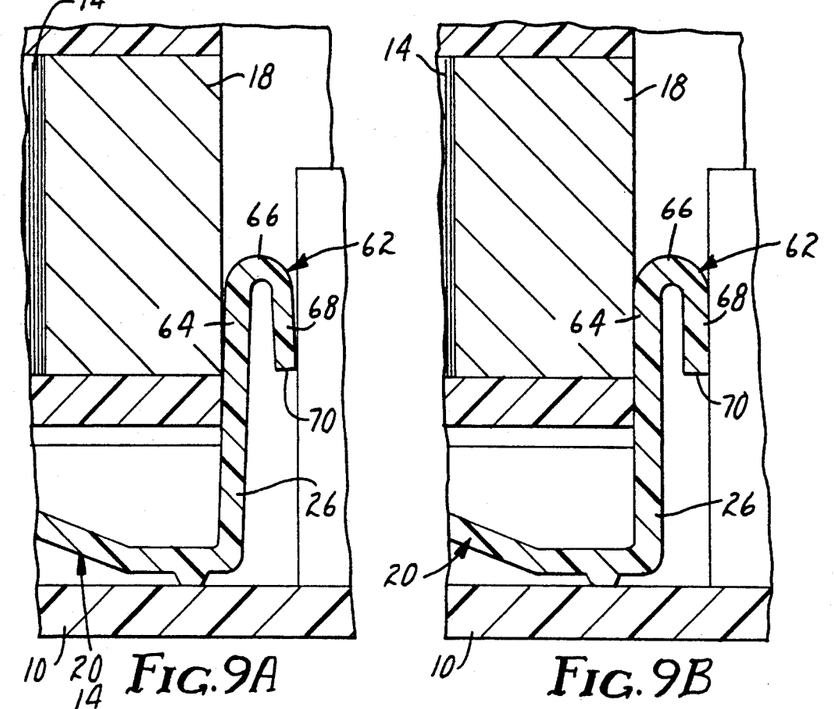
FIGS. 9A–9D are cross-sectional views of the shock shield according to another embodiment of the present invention during various stages of loading.
Figure 9C:
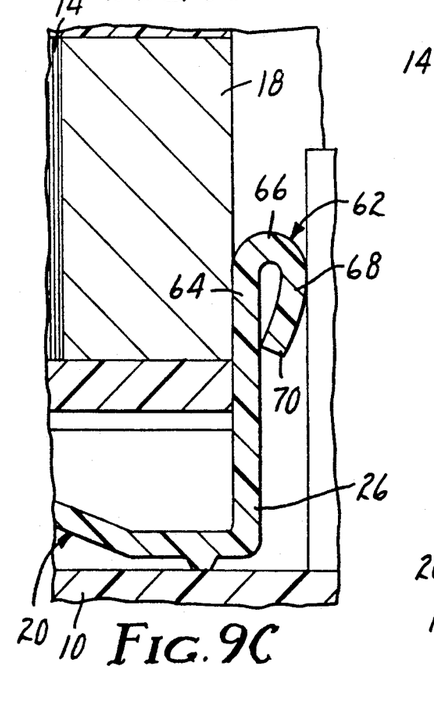
Figure 9D:
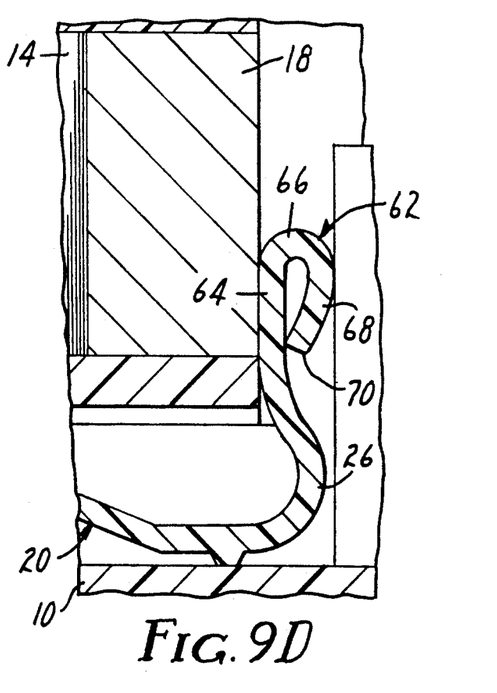

FIG. 9A shows the arm 62 without any radial load and FIG. 9B shows the arm 62 with a first degree of load. As a radial load is applied to the arm 62, the connecting portion 66 of the arm 62 deforms and rotates to compress the arm 62 and move the compressible element 48 to abut the tape hub 12 along substantially the entire length of the downwardly extending end portion 68 of the arm 62. As the load increases, the arm 62 begins to deform in a second direction as shown in FIG. 9C. The free end 70 of the end portion 68 of the arm 62 rotates and flexes toward the cylindrical axial ring 26 to absorb the additional level of shock and load. If the load increases further, the cylindrical axial ring 26 itself deforms, as shown in FIG. 9D, and bows out toward the hub 12. This cylindrical axial ring deformation prevents the arm 62 from flexing too far and exceeding the yield strength of the shock shield 20. This preserves the integrity of the shield and avoids stress fracturing. Additionally, as shown in FIGS. 9B and 9C, the arm 62 increases the contact area between the shock shield 20 and the tape reel 14, thereby spreading out and decreasing the effects of shocks on the tape reel 14.

Figure 10:
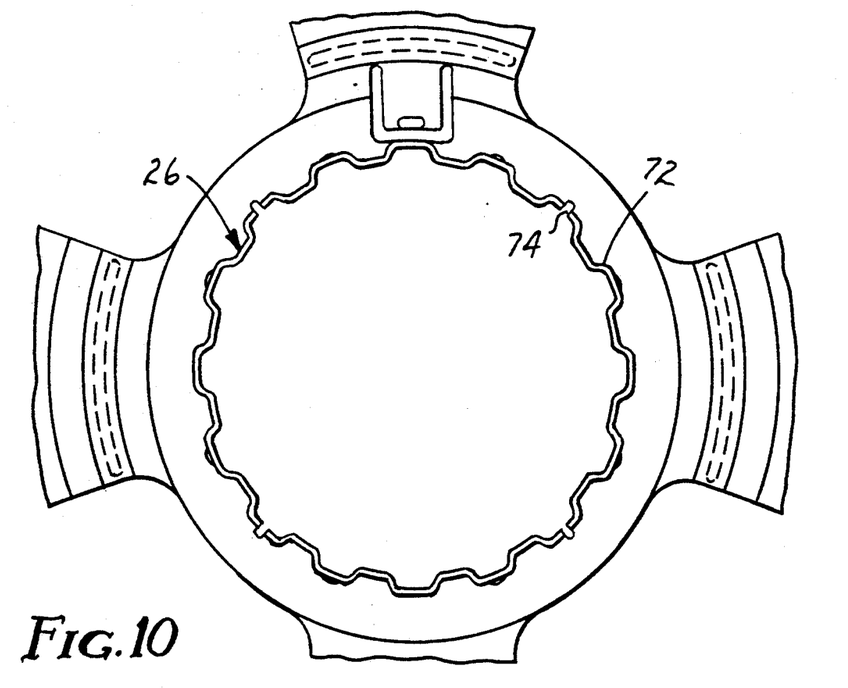
FIG. 10 is a top view of the shock shield according to another embodiment of the present invention.

FIG. 10 is an alternative configuration of the cylindrical axial ring 26 which performs similarly to that of FIG. 9. The cylindrical axial ring 26 is formed of sixteen crenelations 72. Groups of four crenelations 72 are separated by a small gap 74. The corners of the crenelations 72 are rounded to help distribute shocks. When subject to shock, the crenelations 72 flatten out to absorb the shock. This flattening is permitted by the gaps 74. As the crenelations 72 flatten, their circumferential length increases to shorten the width of the gaps 74. If a shock is great enough, the crenelations 72 will flatten sufficiently to totally eliminate the gaps 74. No further expansion is permitted. The width of the gaps 74 limits the amount of expansion to prevent the crenelations 72 from flexing too far and exceeding the yield strength of the shock shield 20. This preserves the integrity of the shield and prevents stress fracturing. Also, using thinner walls for the crenelations 72 increases their elasticity and decreases their brittleness to improve shock absorption. The walls can be 0.1 cm thick rather than 0.22 cm thick as in known bearing rings.

Both axial ring modifications of FIGS. 9 and 10 can be used with the features of FIGS. 1-7 to combine axial and radial shock absorption characteristics. These features also can be used separately. Moreover, these features are not limited to cylindrical shock shields 20 but can be used with any polygonal or non-polygonal shield. Furthermore, the radial shock absorption features as well as the axial shock absorption features can be used in other environments, either together or separately, where shock or vibration absorption is desired. For example, the axial shock absorption features can be used with stacking plates or as double wave washers to provide superior absorption characteristics than known single wave washers; the radial shock absorption features can be used as a bearing.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing form the scope or spirit of the invention.

We claim:

1. A shock shield for use with tape reel cases having a central axial hub for receiving a tape reel, the shock shield comprising:
   a shield body having a central axial hole for rotatably mounting on the central axial hub of the case, the shield body being rotatable together with a tape reel when both are disposed in the case; and
   means, located on the shield body, for permitting a tape reel stored within the case to rotate around its axis within the case together with the shock shield without relative rotation between the tape reel and the shock shield and means located on the shield body for absorbing shocks and preventing case displacements from being transmitted to and damaging the tape reel, wherein the shock absorbing means comprises at least one compressible element formed on the shield body wherein the compressible element is compressible in a direction substantially perpendicular to the plane of the shield body.

2. The shock shield of claim 1 wherein the shield body is annular.

3. The shock shield of claim 2 further comprising a cylindrical axial ring formed around the central axial hole to provide a larger axial surface area contacting the case hub to assist locating the shock shield within the case.

4. The shock shield of claim 3 wherein the shock absorbing means further comprises at least one ring compressible element formed on the cylindrical axial ring formed around the central axial hole wherein the ring compressible element is compressible in a direction substantially parallel to the plane of the shield body.

5. The shock shield of claim 4 wherein the ring compressible element formed on the cylindrical axial ring comprises an annular bearing ring.

6. The shock shield of claim 3 wherein the compressible element comprises an annular bearing ring concentric with the cylindrical axial ring.

7. The shock shield of claim 6 wherein the shock absorbing means comprises a plurality of concentric compressible elements each of which comprises an annular bearing ring.

8. The shock shield of claim 6 wherein the axial height of the annular bearing ring is less than the axial height of the cylindrical axial ring.

9. The shock shield of claim 6 wherein the annular bearing ring has a generally V-shaped cross section.

10. The shock shield of claim 9 wherein the annular bearing ring cross section includes a plurality of V shapes and each V-shape is formed of two body segments and each body segment forms adjacent upright and inverted V shapes such that each body segment serves as half of an upright V and half of an adjacent inverted V.

11. The shock shield of claim 10 wherein the rotation permitting means comprises at least one axially extending tab mounted on the shield body, wherein the tab is for receipt in an opening formed in the tape reel hub and wherein interaction between the tab and the tape reel hub opening causes the tape reel to rotate with the shock shield and eliminates relative rotation therebetween.

12. The shock shield of claim 1 wherein the shock absorbing means comprises a plurality of compressible elements formed on the shield body, wherein each compressible element comprises a cone-shaped projection extending axially out of the plane of the shield body.

13. The shock shield of claim 12 wherein some cone-shaped projections extend above the plane of the shield body and the other cone-shaped projections extend below the plane of the shield body.

14. The shock shield of claim 12 wherein the cone-shaped projections are arranged in a plurality of annular rings.

15. A shock shield for use with tape reel cases having a central axial hub for receiving a tape reel, the shock shield comprising:
   an annular shield body having a central axial hole for rotatably mounting on the central axial hub of the case, the shield body being rotatable together with a tape reel when both are disposed in the case;
   a cylindrical axial ring formed around the central axial hole to provide a larger axial surface area contacting the case hub to assist locating the shock shield within the case; and
   means, located on the shield body, for absorbing shocks and preventing case displacements from being transmitted to and damaging the tape reel, wherein the shock absorbing means comprises:
   a plurality of annular bearing rings concentric with the cylindrical axial ring, wherein the axial height of each annular bearing ring is less than the axial height of the axial ring, and the annular bearing rings have a generally V-shaped cross section;
   a plurality of friction tips provided on each annular V vertex to reduce the surface area of the shock shield which contacts the inside walls of the case to reduce friction and promote freer rotation of the shock shield within the case; and
   at least one compressible element formed on the cylindrical axial ring formed around the central axial hole.

16. The shock shield of claim 15 further comprising means for permitting the tape reel to rotate around its axis within the case wherein the rotation permitting means comprises at least one axially extending tab mounted on the shield body adjacent the cylindrical axial ring, wherein the tab is received in an opening formed in the tape reel hub such that interaction between the tab and the tape reel hub opening causes the tape reel to rotate with the shock shield and eliminates relative rotation therebetween.

17. The shock shield of claim 16 wherein the shield body is formed of four members uniformly disposed around the cylindrical axial ring, radially extending outwardly and widening from the cylindrical axial ring, and culminating in a peripheral annular circumferential portion, wherein the four circumferential portions extend for over 80% of the total circumference of the shield body, and open areas are formed between adjacent radially extending members to enhance the ability of the shock shield to twist.

18. A shock shield for use with tape reel cases having a central axial hub for receiving a tape reel, the shock shield comprising:

an annular shield body having a central axial hole for rotatably mounting on the central axial hub of the case, the shield body being rotatable together with a tape reel when both are disposed in the case, wherein the shield body is formed of a plurality of members which radially extend from a radially central portion of the shield body and culminate in a peripheral annular circumferential portion to form open areas between adjacent radially extending members to enhance the ability of the shock shield to twist; and means for permitting a tape reel stored within the case to rotate around its axis within the case together with the shock shield and for absorbing shocks and preventing case displacements from being transmitted to and damaging the tape reel, wherein the rotation permitting means and the shock absorbing means comprises at least one compressible element formed on the shield body, wherein the compressible element is compressible in a direction substantially perpendicular to the plane of the shield body.

19. A shock shield for use with tape reel cases having a central axial hub for receiving a tape reel, the shock shield comprising:

an annular shield body having a central axial hole for rotatably mounting on the central axial hub of the case, the shield body being rotatable together with a tape reel when both are disposed in the case;

a cylindrical axial ring formed around the central axial hole to provide a larger axial surface area contacting the case hub to assist locating the shock shield within the case;

means for permitting a tape reel stored within the case to rotate around its axis within the case and for absorbing shocks and preventing case displacements from being transmitted to and damaging the tape reel, wherein the rotation permitting means and the shock absorbing means comprises at least one compressible element formed on the shield body, wherein the compressible element comprises an annular bearing ring concentric with the cylindrical axial ring, and wherein the annular bearing ring has a generally V-shaped cross section; and a plurality of friction tips provided on each annular V vertex to reduce the surface area of the shock shield which contacts the inside walls of the case to reduce friction and promote freer rotation of the shock shield within the case.

20. A shock shield for use with tape reel cases having a central axial hub for receiving a tape reel, the shock shield comprising:

an annular shield body having a central axial hole for rotatably mounting on the central axial hub of the case, the shield body being rotatable together with a tape reel when both are disposed in the case; and a cylindrical axial ring formed around the central axial hole to provide a larger axial surface area contacting the case hub to assist locating the shock shield within the case;

means for absorbing shocks and preventing case displacements form being transmitted to and damaging the tape reel, wherein the shock absorbing means comprises at least one compressible element formed on the shield body; and means for permitting a tape reel stored within the case to rotate around its axis within the case wherein the rotation permitting means comprises at least one axially extending tab mounted on the shield body, wherein the tab is for receipt in an opening formed in the tape reel hub wherein interaction between the tab and the tape reel hub opening causes the tape reel to rotate with the shock shield and eliminates relative rotation therebetween.

21. A shock shield for use with tape reel cases having a central axial hub for receiving a tape reel, the shock shield comprising:

an annular shield body having a central axial hole for rotatably mounting on the central axial hub of the case, the shield body being rotatable together with a tape reel when both are disposed int he case, wherein the shield body is formed of a plurality of members which radially extend from the cylindrical axial ring and each culminates in a peripheral annular circumferential portion to form open areas between adjacent radially extending members to enhance the ability of the shock shield to twist; and a cylindrical axial ring formed around the central axial hole to provide a larger axial surface area contacting the case hub to assist locating the shock shield within the case;

means for permitting a tape reel stored within the case to rotate around its axis within the case and for absorbing shocks and preventing case displacements from being transmitted to and damaging the tape reel, wherein the rotation permitting means and the shock absorbing means comprises at least one compressible element formed on the shield body.

22. The shock shield of claim 21 wherein the plurality of circumferential portions are uniformly disposed around the cylindrical axial ring and extend for at least 80% of the total circumference of the shield body.

23. The shock shield of claim 22 wherein the radially extending members widen from the cylindrical axial ring to the circumferential portions.

* * * * *

UNITED STATES PATENT AND TRADEMARK OFFICE
CERTIFICATE OF CORRECTION

PATENT NO. : 5,232,092
DATED : August 3, 1993
INVENTOR(S) : Chamberlin et al.

It is certified that error appears in the above-indentified patent and that said Letters Patent is hereby corrected as shown below:

Col. 8, line 3, "claim 10" should read --claim 1--.

Col. 10, line 13, "form" should read --from--.
Col. 10, line 33, "int he" should read --in the--.

Signed and Sealed this

Twentieth Day of December, 1994

Attest:

BRUCE LEHMAN

*Attesting Officer*  *Commissioner of Patents and Trademarks*